US011237304B2

(12) United States Patent
Huang (10) Patent No.: US 11,237,304 B2
(45) Date of Patent: Feb. 1, 2022

(54) SELF-TEMPERATURE FOCUS COMPENSATION DEVICE

(71) Applicant: Shi-Hwa Huang, New Taipei (TW)

(72) Inventor: Shi-Hwa Huang, New Taipei (TW)

(*) Notice: Subject to any disclaimer, the term of this patent is extended or adjusted under 35 U.S.C. 154(b) by 5 days.

(21) Appl. No.: 16/882,696

(22) Filed: May 25, 2020

(65) Prior Publication Data

US 2021/0302705 A1    Sep. 30, 2021

(30) Foreign Application Priority Data

Mar. 27, 2020   (TW) ................................. 109110428

(51) Int. Cl.
*G02B 3/08* (2006.01)
*G02B 15/14* (2006.01)

(52) U.S. Cl.
CPC ............ *G02B 3/08* (2013.01); *G02B 15/1421* (2019.08)

(58) Field of Classification Search
None
See application file for complete search history.

(56) References Cited

U.S. PATENT DOCUMENTS

| | | | | |
|---|---|---|---|---|
| 5,260,828 A * | 11/1993 | Londono | ............... | G02B 5/1876 359/565 |
| 6,262,844 B1 * | 7/2001 | Soskind | ............... | G02B 5/1814 359/565 |
| 6,950,243 B2 * | 9/2005 | Wiese | .................. | G02B 13/146 359/689 |
| 10,215,890 B2 * | 2/2019 | Perreault | ............ | G02B 27/0025 |
| 2010/0302654 A1 * | 12/2010 | Amano | .................... | G02B 3/08 359/742 |

FOREIGN PATENT DOCUMENTS

| | | |
|---|---|---|
| CN | 201344650 | 11/2009 |
| TW | 201730662 | 9/2017 |
| TW | 201732346 | 9/2017 |

* cited by examiner

*Primary Examiner* — Darryl J Collins
(74) *Attorney, Agent, or Firm* — JCIPRNET (57) ABSTRACT

A self-temperature focus compensation device adapted to cooperate with a lens group and including at least one Fresnel lens group is provided. Each Fresnel lens group has zero focal power at a specific temperature and is a cemented lens. Each Fresnel lens group includes a first Fresnel lens and a second Fresnel lens. The first Fresnel lens has positive focal power. The second Fresnel lens has negative focal power. A sum of a focal power change of the at least one Fresnel lens group with a temperature change and a focal power change of the lens group with the temperature change is zero.

16 Claims, 10 Drawing Sheets

SELF-TEMPERATURE FOCUS COMPENSATION DEVICE

CROSS-REFERENCE TO RELATED APPLICATION

This application claims the priority benefit of Taiwan application serial no. 109110428, filed on Mar. 27, 2020. The entirety of the above-mentioned patent application is hereby incorporated by reference herein and made a part of this specification.

BACKGROUND OF THE INVENTION

1. Field of the Invention

The invention relates to a compensation device, and in particular, to a self-temperature focus compensation device for an optical imaging system.

2. Description of Related Art

Due to low costs and easy processing of plastics, plastic lenses or optical lenses composed of glass and plastics are widely used in the consumer market and industrial fields. However, a refractive index of the plastic lens is likely to change with a temperature change, changing a focus of the optical lens. When a temperature of a use environment changes, the optical lens cannot maintain a clear image during imaging, resulting in the so-called defocusing, for example, defocusing generated as a result of heat generated by a light source of a projection system, a change of a solar power generation system with an atmospheric temperature, and a temperature change of a use environment of a vehicle-mounted lens, etc.

In order to overcome defocusing, currently, a temperature control system is usually used in the market to maintain the temperature of the use environment. However, costs of the temperature control system are usually beyond a range acceptable to common consumers. In addition, for example, the solar power generation system usually encounters severe defocusing as a result of difficulty in using the temperature control system. Therefore, there is a need for a focus compensation device capable of relieving defocusing.

SUMMARY OF THE INVENTION

The invention provides a self-temperature focus compensation device that may cooperate with other lens groups and compensate for a focal power change of the lens group caused by a temperature change.

An embodiment of the invention provides a self-temperature focus compensation device adapted to cooperate with a lens group, including at least one Fresnel lens group. Each of the Fresnel lens groups is a cemented lens with zero focal power at a specific temperature. Each Fresnel lens group includes a first Fresnel lens and a second Fresnel lens. The first Fresnel lens has positive focal power. The second Fresnel lens has negative focal power. A sum of a focal power change of the at least one Fresnel lens group with a temperature change and a focal power change of the lens group with the temperature change is zero.

An embodiment of the invention provides a self-temperature focus compensation device adapted to cooperate with a lens group, including at least one Fresnel lens group. Each of the Fresnel lens groups has zero focal power at a specific temperature. Each Fresnel lens group includes a first Fresnel lens and a second Fresnel lens. The first Fresnel lens has positive focal power. The second Fresnel lens has negative focal power. Air gaps of the first Fresnel lens and the second Fresnel lens along an optical axis of the Fresnel lens group of the first Fresnel lens and the second Fresnel lens are greater than zero. A sum of a focal power change of the at least one Fresnel lens group with a temperature change and a focal power change of the lens group with the temperature change is zero.

In an embodiment of the invention, the lens group has focal power greater than zero. When a temperature of the self-temperature focus compensation device is greater than the specific temperature, a difference between focal power of the second Fresnel lens at the temperature and focal power of the second Fresnel lens at the specific temperature is greater than zero. When the temperature of the self-temperature focus compensation device is less than the specific temperature, the difference between the focal power of the second Fresnel lens at the temperature and the focal power of the second Fresnel lens at the specific temperature is less than zero.

In an embodiment of the invention, the first Fresnel lens is made of glass. The second Fresnel lens is made of plastics. A ratio of a refractive index change of the second Fresnel lens with a temperature to a refractive index change of the first Fresnel lens with the temperature is greater than 10.

In an embodiment of the invention, the lens group has focal power less than zero. When the temperature of the self-temperature focus compensation device is greater than the specific temperature, a difference between focal power of the first Fresnel lens at the temperature and focal power of the first Fresnel lens at the specific temperature is less than zero. When the temperature of the self-temperature focus compensation device is less than the specific temperature, the difference between the focal power of the first Fresnel lens at the temperature and the focal power of the first Fresnel lens at the specific temperature is greater than zero.

In an embodiment of the invention, the first Fresnel lens is made of plastics. The second Fresnel lens is made of glass. A ratio of a refractive index change of the first Fresnel lens with a temperature to a refractive index change of the second Fresnel lens with the temperature is greater than 10.

In an embodiment of the invention, the first Fresnel lens includes a plurality of annular tooth-shaped first Fresnel surfaces surrounding the optical axis. The second Fresnel lens includes a plurality of annular tooth-shaped second Fresnel surfaces surrounding the optical axis. The first Fresnel surface and the second Fresnel surface face each other, and a sum of a radius of curvature of the first Fresnel surface and a radius of curvature of the second Fresnel surface on an axis parallel to the optical axis is zero.

In an embodiment of the invention, the first Fresnel lens includes a first optical surface opposite to the first Fresnel surface, the first optical surface being a plane. The second Fresnel lens includes a second optical surface opposite to the second Fresnel surface, the second optical surface being a plane.

In an embodiment of the invention, the first Fresnel lens includes a first optical surface opposite to the first Fresnel surface, the first optical surface being a concave surface or a convex surface. The second Fresnel lens includes a second optical surface opposite to the second Fresnel surface, the second optical surface being a concave surface or a convex surface. A sum of a radius of curvature of the first optical surface and a radius of curvature of the second optical surface on an axis parallel to the optical axis is zero.

In an embodiment of the invention, each of the Fresnel lens groups satisfies the following relationship:

$$h' < \frac{d'}{\sqrt{n^2-1}},$$

where h' is a distance of each annular tooth of the first Fresnel lens in a direction perpendicular to the optical axis, d' is a maximum thickness of each annular tooth of the first Fresnel lens in a direction parallel to the optical axis, and n is a refractive index of the first Fresnel lens.

Based on the above, according to the self-temperature focus compensation device in the embodiments of the invention, since each Fresnel lens group has zero focal power at the specific temperature, and the sum of the focal power change of the at least one Fresnel lens group with the temperature change and the focal power change of the lens group with the temperature change is zero, the self-temperature focus compensation device can compensate the focal power change of the lens group with the temperature change, which costs relatively low and is applicable for most lens groups.

DESCRIPTION OF THE EMBODIMENTS

Figure 1:
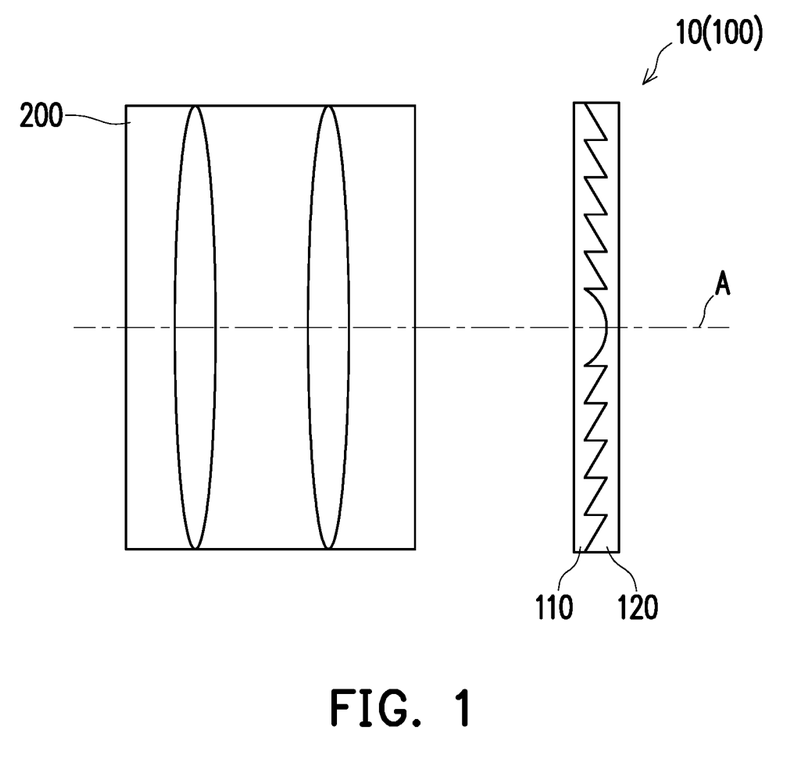
FIG. 1 is a schematic diagram of a self-temperature focus compensation device according to an embodiment of the invention.
Figure 2:
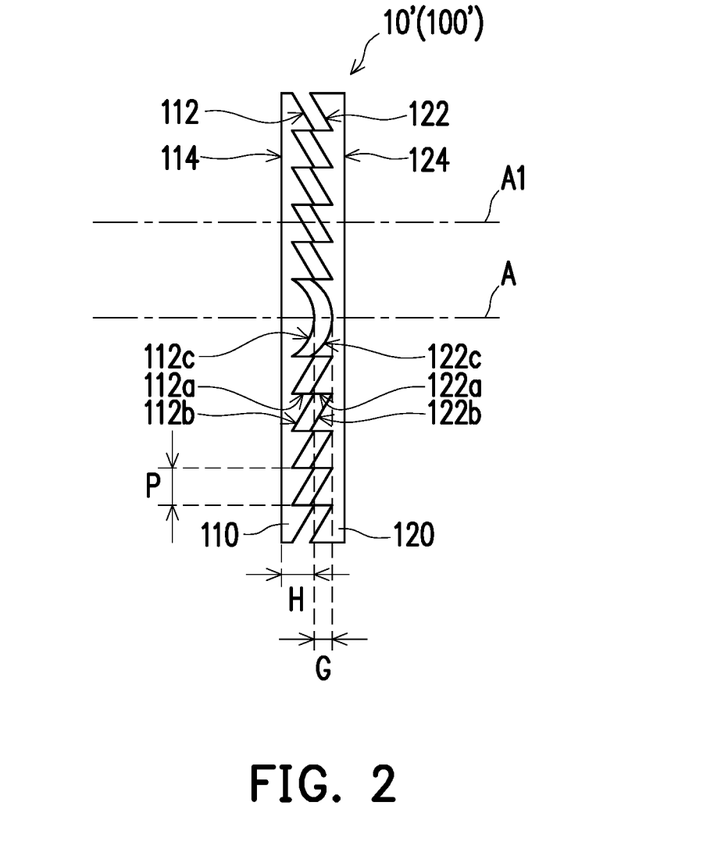
FIG. 2 is a schematic diagram of a Fresnel lens group of a self-temperature focus compensation device according to an embodiment of the invention.

FIG. 1 is a schematic diagram of a self-temperature focus compensation device according to an embodiment of the invention. FIG. 2 is a schematic diagram of a Fresnel lens group of a self-temperature focus compensation device according to an embodiment of the invention. Referring to both FIG. 1 and FIG. 2, an embodiment of the invention provides a self-temperature focus compensation device 10 adapted to cooperate with a lens group 200, including at least one Fresnel lens group 100. Each of the Fresnel lens groups 100 has zero focal power at a specific temperature. The specific temperature is, for example, 25 degrees Celsius. Each Fresnel lens group 100 includes a first Fresnel lens 110 and a second Fresnel lens 120. The first Fresnel lens 110 has positive focal power. The second Fresnel lens 120 has negative focal power. A sum of a focal power change of the at least one Fresnel lens group 100 with a temperature change and a focal power change of the lens group 200 with the temperature change is zero.

In the present embodiment, as shown in FIG. 1, the Fresnel lens group 100 may be a cemented lens. In an embodiment, as shown in FIG. 2, air gaps G of a first Fresnel lens 110 and a second Fresnel lens 120 in a Fresnel lens group 100' of a self-temperature focus compensation device 10' along an optical axis A of the Fresnel lens group 100' of the first Fresnel lens and the second Fresnel lens are greater than zero.

Specifically, in the present embodiment of the invention, the first Fresnel lens 110 includes a plurality of annular tooth-shaped first Fresnel surfaces 112 surrounding the optical axis A. The second Fresnel lens 120 includes a plurality of annular tooth-shaped second Fresnel surfaces 122 surrounding the optical axis A. An annular tooth of the first Fresnel surface 112 includes a central surface 112c, an optical effective surface 112b, and an optical ineffective surface 112a. The central surface 112c and the optical effective surface 112b are configured to have an effect of light focusing or light diverging, and the optical ineffective surface 112a does not contribute to expected light focusing or light diverging of the first Fresnel lens 110. Furthermore, the central surface 112c is connected, through one of the optical ineffective surfaces 112a, an optical effective surface 112b closest to the central surface 112c, and every two optical effective surfaces 112b are connected through one of the optical ineffective surfaces 112a. Similarly, an annular tooth of the second Fresnel surface 122 includes a central surface 122c, an optical effective surface 122b, and an optical ineffective surface 122a. A connection relationship among the central surface, the optical effective surface, and the optical ineffective surface is similar to that of the first Fresnel surface 112. The descriptions thereof are omitted herein.

For ease of description, the optical effective surfaces 112b and 122b in FIG. 2 are simply illustrated in a plane. However, the invention is not limited thereto. The central surfaces 112c and 122c and the optical effective surfaces 112b, and 122b may also be spherical surfaces, aspherical surfaces, or a combination of curved surfaces. Furthermore, FIG. 2 illustrates that the first Fresnel lens 110 and the second Fresnel lenses 120 are contoured Fresnel lenses. In other words, in an example of the first Fresnel lens 110, all optical effective surfaces 112b of the Fresnel surface 112 have an equal maximum thickness H. However, the invention is not limited to thereto. The first Fresnel lens 110 and the second Fresnel lenses 120 may also be equi-ring Fresnel lenses. In other words, in the example of the first Fresnel lens 110 pitches P between the optical effective surfaces 112b of the Fresnel surface 112 are equal.

In addition, in the present embodiment, the first Fresnel surface 112 and the second Fresnel surface 122 face each other, and a sum of a radius of curvature of the first Fresnel surface 112 and a radius of curvature of the second Fresnel surface 122 on an axis A1 parallel to the optical axis A is zero.

Figure 3:
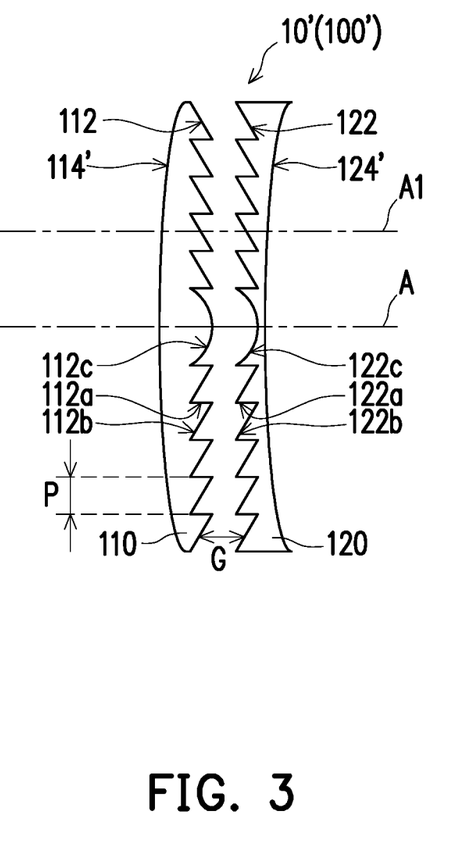
FIG. 3 is a schematic diagram of another Fresnel lens group of a self-temperature focus compensation device according to an embodiment of the invention.

FIG. 3 is a schematic diagram of another Fresnel lens group of a self-temperature focus compensation device according to an embodiment of the invention. Referring to FIG. 2 first, in the present embodiment, the first Fresnel lens 110 includes a first optical surface 114 opposite to the first Fresnel surface 112, the first optical surface 114 being a plane. The second Fresnel lens 120 includes a second optical surface 124 opposite to the second Fresnel surface 122, the second optical surface 124 being a plane. However, the invention is not limited thereto. Referring to FIG. 3, in an embodiment, the first optical surface 114 and the second optical surface 124 may be a concave surface or a convex surface. A sum of a radius of curvature of the first optical surface 114 and a radius of curvature of the second optical surface 124 on an axis A1 parallel to the optical axis A is zero. For example, a first optical surface 114' of a first Fresnel lens 110' in FIG. 3 is a convex surface, and a second optical surface 124' of a second Fresnel lens 120' is a concave surface.

Figure 4:
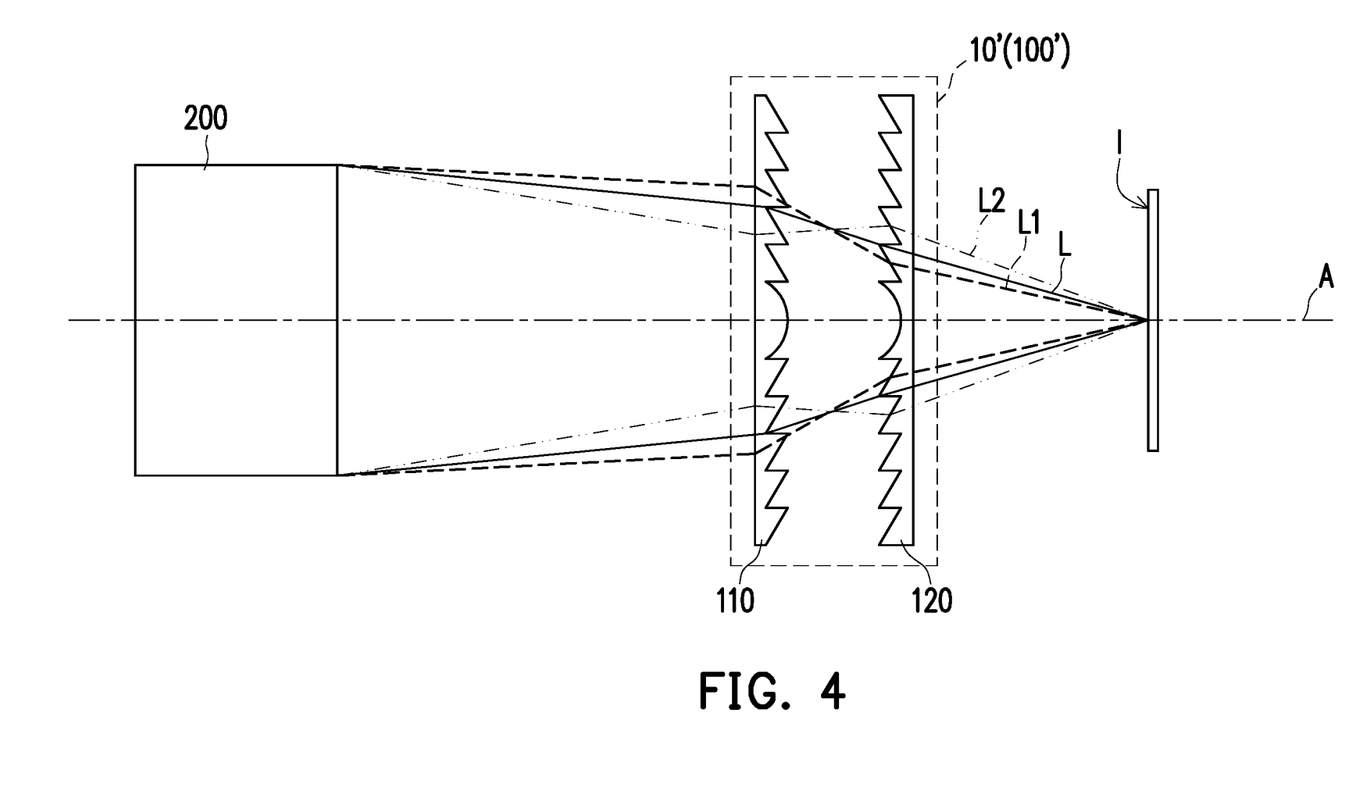
FIG. 4 is a schematic diagram of light tracking of a self-temperature focus compensation device at different temperatures according to an embodiment of the invention.

FIG. 4 is a schematic diagram of light tracking of a self-temperature focus compensation device at different temperatures according to an embodiment of the invention. FIG. 4 illustrates light tracking of the lights L, L1, and L2. Light tracking of the light L is performed, for example, when a temperature of the self-temperature focus compensation device 10' is equal to a specific temperature, light tracking of the light L1 is performed, for example, when the temperature of the self-temperature focus compensation device 10' is greater than the specific temperature, and light tracking of the light L2 is performed, for example, when the temperature of the self-temperature focus compensation device 10' is less than the specific temperature.

In FIG. 4, that the lens group 200 has focal power greater than zero is used as an example. Referring to FIG. 4, in the present embodiment, when the temperature of the self-temperature focus compensation device 10' is greater than the specific temperature, for example, the temperature is greater than or equal to 60 degrees Celsius, a difference between focal power of the second Fresnel lens 120 at the temperature and focal power of the second Fresnel lens at the specific temperature is greater than zero. On the contrary, when the temperature of the self-temperature focus compensation device 10' is less than the specific temperature, for example, the temperature is less zero degrees Celsius, the difference between the focal power of the second Fresnel lens 120 at the temperature and the focal power of the second Fresnel lens at the specific temperature is less than zero. In other words, when the temperature is greater than the specific temperature, the lens group 200 generates a focal power change of −ΔK, and the second Fresnel lens 120 generates a focal power compensation amount of +ΔK. On the contrary when the temperature is less than the specific temperature, the lens group 200 generates a focal power change of +ΔK, and the second Fresnel lens 120 generates a focal power compensation amount of −ΔK. Even if the temperature of the self-temperature focus compensation device 10' is different from the specific temperature, the self-temperature focus compensation device 10' can generate a corresponding focal power compensation amount corresponding to a focal power change of the lens group 200, so that the lens group 200 and the self-temperature focus compensation device 10' maintain unchanged system focal power. Therefore, the lights L, L1, and L2 can be focused on an imaging plane I.

For example, in the present embodiment, the first Fresnel lens 110 is made of glass. The second Fresnel lens 120 is made of plastics. A ratio of a refractive index change of the second Fresnel lens 120 with a temperature to a refractive index change of the first Fresnel lens 110 with the temperature is greater than 10. In other words, for a focal power compensation amount that can be generated by the Fresnel lens group 100, only the second Fresnel lens 120 made of plastics needs to be considered.

In addition, that the lens group 200 has focal power less than zero is used as an example. In an embodiment, when the temperature of the self-temperature focus compensation device 10' is greater than the specific temperature, a difference between focal power of the first Fresnel lens 110 at the temperature and focal power of the first Fresnel lens at the specific temperature is less than zero. When the temperature of the self-temperature focus compensation device 10' is less than the specific temperature, the difference between the focal power of the first Fresnel lens 110 at the temperature and the focal power of the first Fresnel lens at the specific temperature is greater than zero. The first Fresnel lens 110 is made of plastics. The second Fresnel lens 120 is made of glass. A ratio of a refractive index change of the first Fresnel lens 110 with a temperature to a refractive index change of the second Fresnel lens 120 with the temperature is greater than 10. In other words, for a focal power compensation amount that can be generated by the Fresnel lens group 100, only the first Fresnel lens 110 made of plastics needs to be considered.

Based on the above, according to the self-temperature focus compensation device 10 or 10' in the embodiments of the invention, since each Fresnel lens groups 100 or 100' has zero focal power at the specific temperature, and the sum of the focal power change of the at least one Fresnel lens group 100 or 100' with the temperature change and the focal power change of the lens group 200 with the temperature change is zero, the self-temperature focus compensation device 10 or 10' can compensate the focal power change of the lens group with the temperature change. Compared to processing manners such as using a temperature control device, the self-temperature focus compensation device 10 or 10' according to the embodiments of the invention has lower costs and is applicable to most lens groups. Moreover, since the Fresnel lens group 100 may be a cemented lens, a system length of the self-temperature focus compensation device 10 is relatively small. In addition, since the air gaps G of the first Fresnel lens 110 and the second Fresnel lens 120 in the Fresnel lens group 100' along the optical axis A of the Fresnel lens group 100' of the first Fresnel lens and the second Fresnel lens may be greater than zero, an air gap G of the Fresnel lens group 100' may be used as a compensation space for a volume change caused by a temperature change. Therefore, system deformation of the Fresnel lens group 100' caused by the temperature change can be reduced, facilitating maintaining of imaging quality of the self-temperature focus compensation device 10'.

In addition, in the self-temperature focus compensation device 10 or 10' of the embodiments of the invention, a sum of a radius of curvature of the first Fresnel surface 112 of the first Fresnel lens 110 and a radius of curvature of the second Fresnel surface 122 of the second Fresnel lens 120 on the axis A1 parallel to the optical axis A is zero. During manufacturing, a glass Fresnel lens that needs to be formed at a higher temperature may be formed first, and then the glass Fresnel lens may be used as one of molds to form a plastic Fresnel lens that may be formed at a lower temperature. Therefore, development costs of the mold can be reduced for a manufacturer. Furthermore, the first optical surface 114 of the first Fresnel lens 110, the first optical surface 114' of the first Fresnel lens 110', the second optical surface 124 of the second Fresnel lens 120, and the second optical surface 124' of the second Fresnel lens 120' may be a plane, a concave surface, or a convex surface. A user may design a self-temperature focus compensation device 10 or 10' with a suitable shape according to spatial arrangement of different lens groups, bringing convenience for the user in use.

Figure 5:
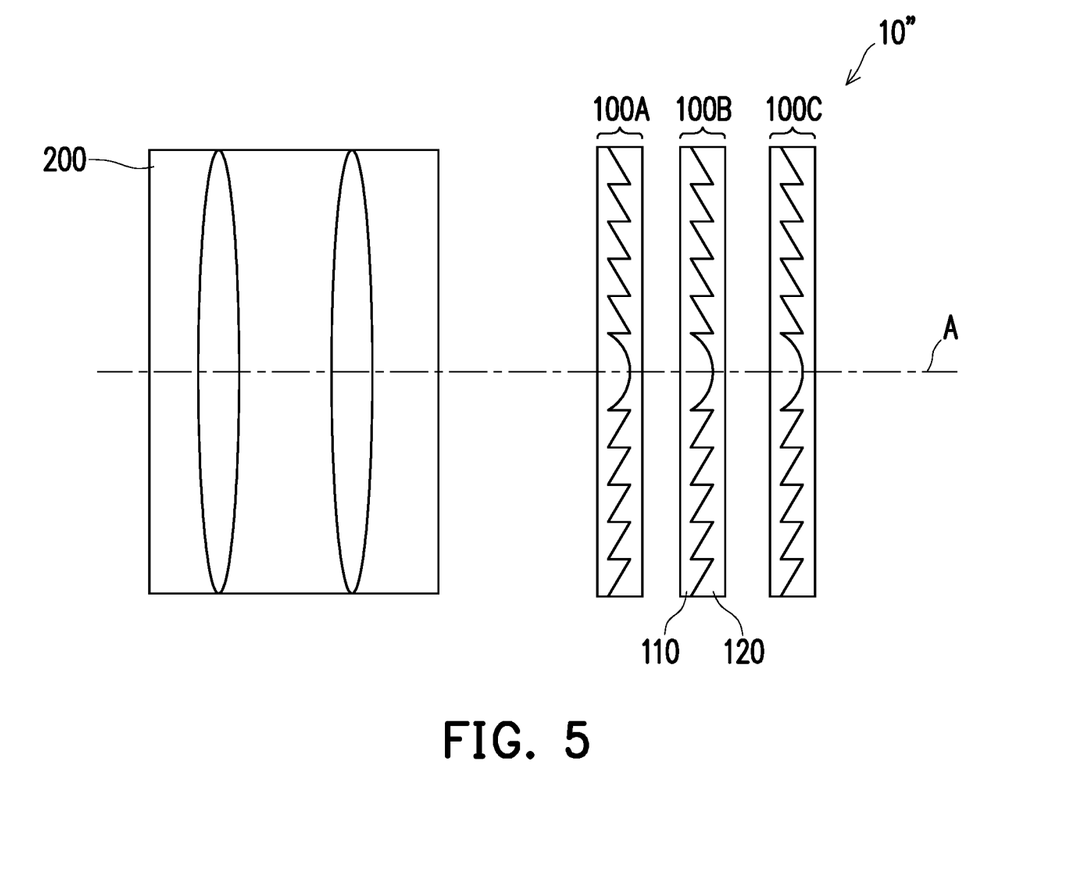
FIG. 5 is a schematic diagram of another self-temperature focus compensation device according to an embodiment of the invention.

FIG. 5 is a schematic diagram of another self-temperature focus compensation device according to an embodiment of the invention. Referring to FIG. 5, in an embodiment, a self-temperature focus compensation device 10" may include a plurality of Fresnel lens groups 100A, 100B, and 100C. In other words, each of the Fresnel lens groups 100A, 100B, and 100C in the self-temperature focus compensation device 10" can compensate a focal power change of the lens group 200 caused by a temperature change. Therefore, a user may increase or reduce a number of the Fresnel lens groups 100A, 100B, and 100C in the temperature focus compensation device 10" correspondingly according to the focal power change of the lens group 200.

Figure 6A:
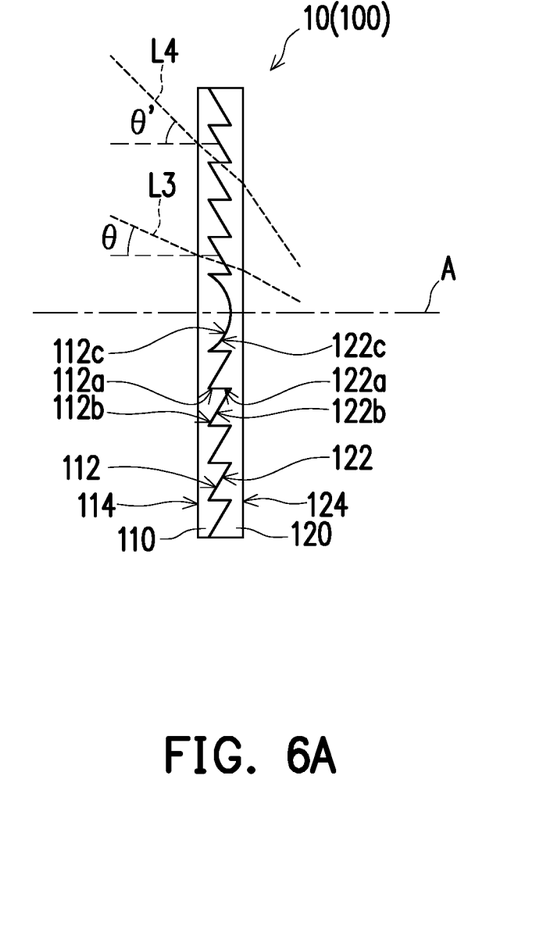
FIG. 6A is a schematic diagram of light incident on a Fresnel lens group.
Figure 6B:
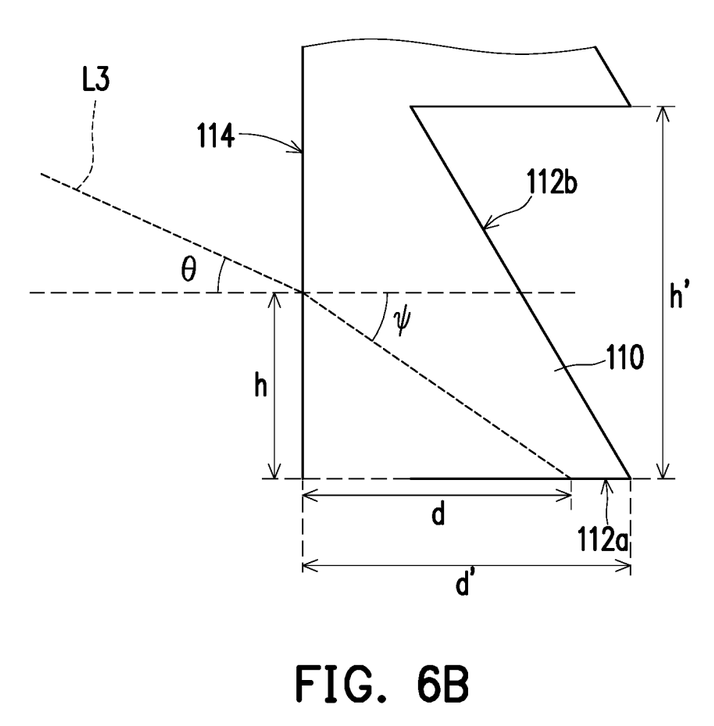
FIG. 6B is a partial enlarged view of a light L3 incident on the first Fresnel lens.

FIG. 6A is a schematic diagram of light incident on a Fresnel lens group. FIG. 6B is a partial enlarged view of a light L3 incident on the first Fresnel lens. In FIG. 6A, an included angle between the light L3 and the optical axis A before incident on the first Fresnel lens 110, that is, an incident angle of the light L3 is 0, and an included angle between the light L4 and the optical axis A before incident on the first Fresnel lens 110, that is, an incident angle of the light L4 is 0'. Referring to FIG. 6A and FIG. 6B, when the light L4 is incident on the Fresnel lens group 100 at the angle of θ', the light L4 passes through the optical ineffective surfaces 112a and 122a without contribution to light focusing or light diverging of the first Fresnel lenses 110 and 120, and forms a stray light. Therefore, the light L4 adversely affects imaging of the self-temperature focus compensation device 10. On the contrary, that the light L3 is incident on the Fresnel lens group 100 at the angle of θ and passes through the optical effective surfaces 112b and 122b is exemplary.

Specifically, according to the light tracking of the light L3 in FIG. 6B, the following relationships may be obtained:

$$d = h/\tan\psi,$$

$$\sin\theta = n\sin\psi, \text{ and}$$

$$d = h\sqrt{(n/\sin\theta)^2 - 1}.$$

$\psi$ is an angle between the light L3 and the optical axis A after the light passes through the first optical surface 114, that is, a refraction angle of the light L3, d is a distance between the first optical surface 114 and an intersection of the light L3 at the optical ineffective surface 112a after the light passes through the first optical surface 114, h is a distance between a position at which the light L3 is incident on the first optical surface 114 and the optical ineffective surface 112a, and n is the refractive index of the first Fresnel lens 110. Generally, since sin θ<1, the following relationships may be obtained:

$$\sin\theta = \frac{n}{\sqrt{(d/h)^2 + 1}} < 1, \text{ and}$$

$$h < \frac{d}{\sqrt{n^2 - 1}}.$$

According to a geometric relationship in FIG. 6B, a distance d is extended to a distance d', and a formula (1) may be further obtained:

$$h' < \frac{d'}{\sqrt{n^2 - 1}}. \tag{1}$$

h' is a distance of each annular tooth of the first Fresnel lens 110 in a direction perpendicular to the optical axis A (that is, a distance between two adjacent optical effective surfaces 112b in the direction perpendicular to the optical axis A), and d' is a maximum thickness of each annular tooth of the first Fresnel lens 110 in a direction parallel to the optical axis A. For example, the plastic material of Mitsubishi EP-8000 has a refractive index n of about 1.66. If a lens thickness of the first Fresnel lens 110 is 1 mm (that is, d' is 1 mm) and a lens radius of the first Fresnel lens 110 is 10 mm, according to the formula (1), an average distance among the annular teeth of the first Fresnel lens 110 in the direction perpendicular to the optical axis A is 0.7547 mm (that is, h' is 0.7547 mm). Therefore, the first Fresnel lens 110 exemplarily needs at least 14 (10/0.7547=13.25) annular teeth.

Based on the above, when the Fresnel lens group 100 satisfies the condition in the formula (1), the optical system may avoid flare, so that the imaging quality of the optical system can be improved.

Figure 7:
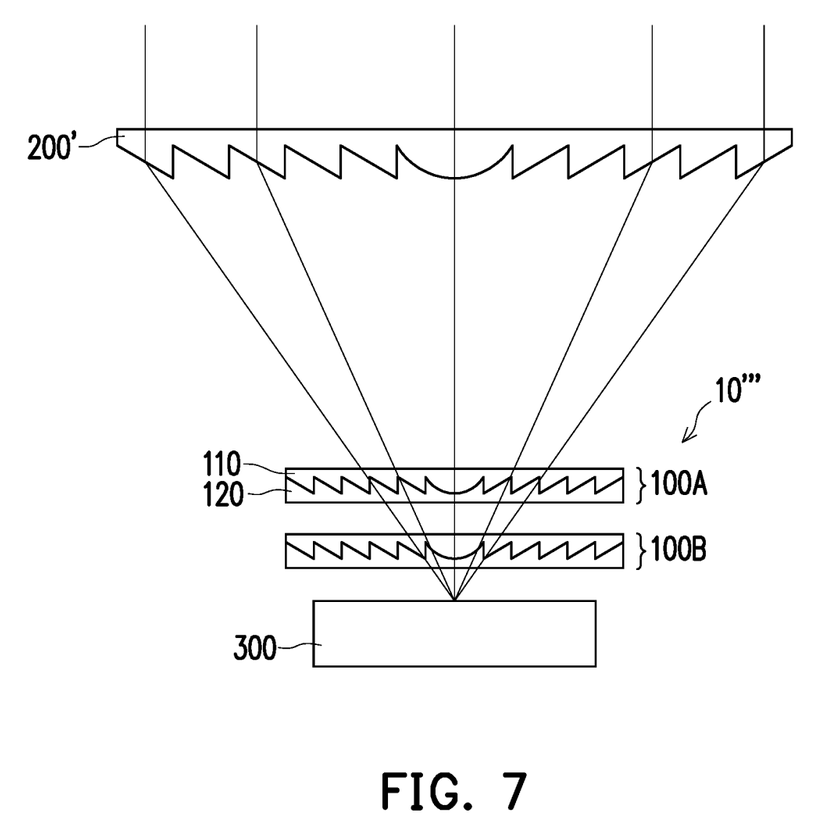
FIG. 7 is a schematic diagram of a self-temperature focus compensation device cooperating with a lens group that is a Fresnel lens according to an embodiment of the invention.

FIG. 7 is a schematic diagram of a self-temperature focus compensation device cooperating with a lens group that is a Fresnel lens according to an embodiment of the invention. Referring to FIG. 7, in an embodiment, a self-temperature focus compensation device 10''' includes a plurality of Fresnel lens groups 100A and 100B. A lens group 200' is a Fresnel lens. Furthermore, the light passes through the lens group 200' and the Fresnel lens groups 100A and 100B to be focused on a photoelectric conversion board 300. A use status in FIG. 7 is, for example, a solar power generation system. For the solar power generation system, a lens thickness of the Fresnel lens can be effectively reduced when a lens size is increased. Therefore, the Fresnel lens is usually selected for the solar power generation system as the lens group 200'. However, at noon in summer, a use environment of the solar power generation system may be much higher than the specific temperature. On the contrary, in winter, the use environment of the solar power generation system may be lower than the specific temperature. For example, in a desert environment, a temperature may reach 80 degrees Celsius at noon in summer, and may be lower than −20 degrees Celsius in winter. For example, the lens group 200' may generate a focal power change of 0.3 mm from a room temperature of 25 degrees Celsius to 85 degrees Celsius. Alternatively, the solar power generation system has a larger temperature change in a use environment outside the earth, such as the moon, Mars, etc. In the present embodiment, the first Fresnel lens 110 is made of, for example, Ohara Optical SBSM18 glass, and has a refractive index of about 1.638, and the second Fresnel lens 120 made of is made of, for example, Mitsubishi EP-5000 plastics, and has a refractive index of about 1.636. Therefore, using the self-temperature focus compensation device 10''' in the present embodiment of the invention helps improve power generation efficiency of the solar power generation system.

Figure 8:
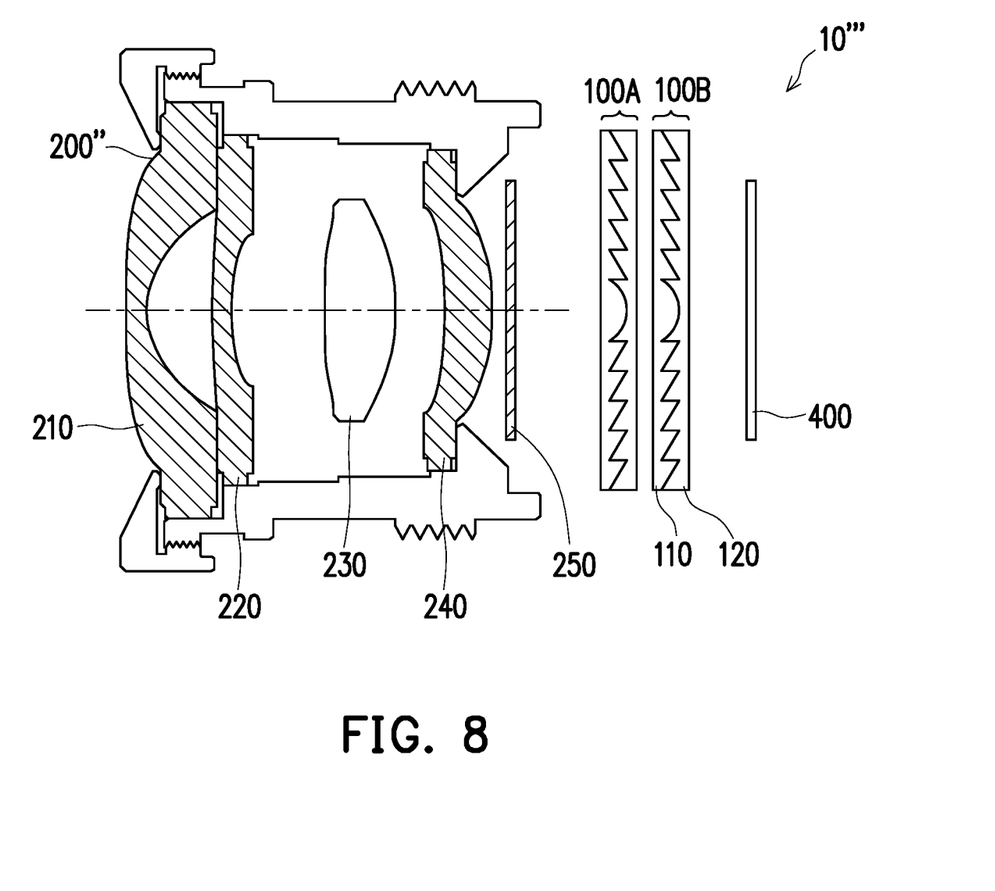
FIG. 8 is a schematic diagram of a self-temperature focus compensation device cooperating with a lens group that is a vehicle-mounted lend according to an embodiment of the invention.

FIG. 8 is a schematic diagram of a self-temperature focus compensation device cooperating with a lens group that is a vehicle-mounted lend according to an embodiment of the invention. Referring to FIG. 8, in another embodiment, lens group 200″ is a vehicle-mounted lens, which includes lenses 210, 220 and 240 made of plastics, a lens 230 made of glass, and an infrared cut-off filter 250. In FIG. 8, light sequentially passes through the lens group 200″ and the Fresnel lens groups 100A and 100B to be imaged on a sensor 400. The sensor 400 may be a complementary metal oxide semiconductor (CMOS). In the present embodiment, the first Fresnel lens 110 is made of, for example, Ohara Optical SBAH11 glass, and has a refractive index of about 1.667, and the second Fresnel lens 120 made of is made of, for example, Mitsubishi EP-8000 plastics, and has a refractive index of about 1.66. Due to complex usage scenarios of vehicle-mounted lenses, it is difficult to maintain optimal imaging quality of the optical system. Therefore, since costs of the self-temperature focus compensation device 10‴ in the present embodiment of the invention are relatively low, the lens group 200″ is combined with the self-temperature focus compensation device 10‴ to compensate for the focal power change, which is a better choice for a user.

In addition, in order to satisfy a focal power change amount compensation effect of the self-temperature focus compensation devices 10, 10′, 10″ and 10‴ and provide a relatively good imaging effect, designing of a Fresnel surface of a contoured Fresnel lens is briefly described below.

Figure 9:
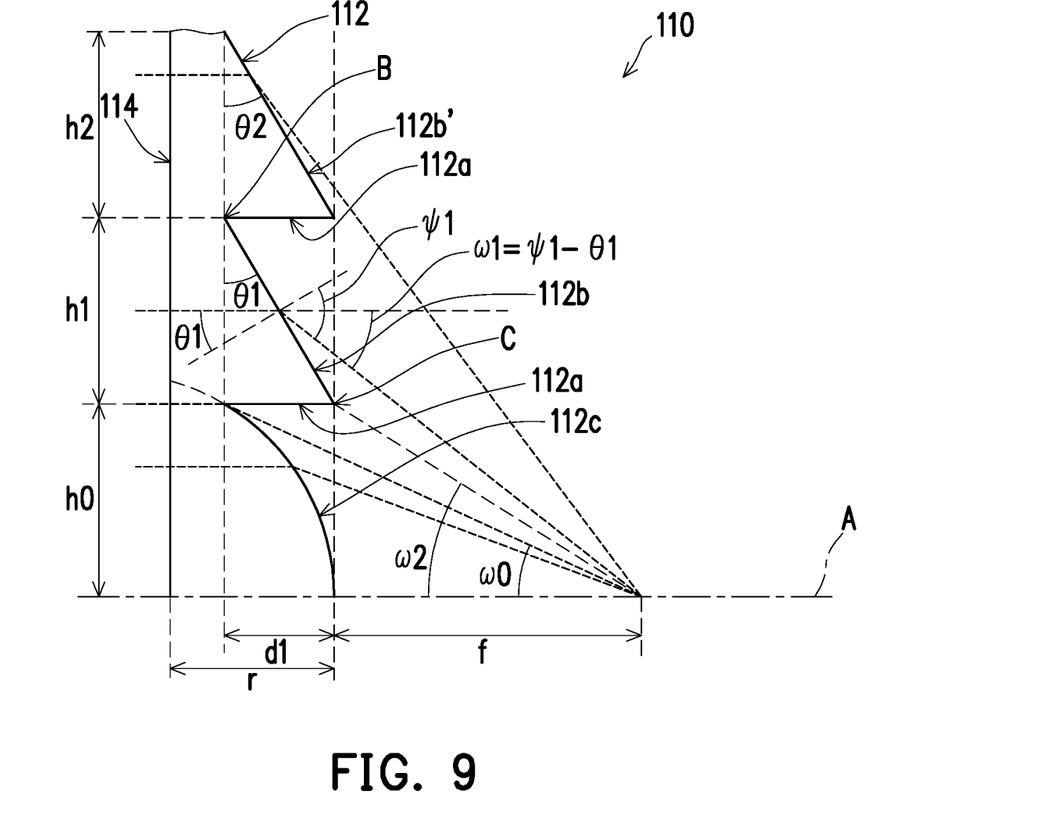
FIG. 9 is a partial schematic diagram of a Fresnel surface of a Fresnel lens according to an embodiment of the invention.

FIG. 9 is a partial schematic diagram of a Fresnel surface of a Fresnel lens according to an embodiment of the invention. Referring to FIG. 9, first, according to the Lensmaker's equation, the following formula (2) may be obtained:

$$K = \frac{1}{f} = (n-1)\frac{1}{r}. \quad (2)$$

K is focal power, f is a focal length, n is a refractive index of the first Fresnel lens 110 at a specific temperature, and r is a radius of a central surface 112c. According to a geometric relationship in FIG. 9, the following formulas (3)-(4) may be obtained:

$$r^2 = h0^2 + (r - d1)^2, \quad (3)$$

$$\tan\omega 0 = \frac{h0}{f + d1}. \quad (4)$$

h0 is a distance between the optical axis A and the optical effective surface 112b closest to the central surface 112c, and d1=r/2. Based on the Snell's Law and a trigonometric function relationship, the following formulas (5)-(6) may be then obtained:

$$n \sin\theta 1 = \sin\omega 1 = \sin(\psi 1 - \theta 1), \quad (5)$$

$$\tan\omega 1 = \frac{n \sin\theta 1}{\sqrt{1 - n^2(\sin\theta 1)^2}}. \quad (6)$$

Furthermore, according to a geometric relationship between B and C in FIG. 9, the following formulas (7)-(8) may be obtained:

$$d1 + f = \frac{h0 + h1}{\tan\omega 1}, \quad (7)$$

$$f = \frac{h0}{\tan\omega 2}. \quad (8)$$

h1 is a distance between the optical effective surface 112b closest to the central surface 112c and a next optical effective surface 112b, that is, a size of the optical effective surface 112b closest to the central surface 112c. Assuming that the angles ω1 and ω2 are similar, according to the formula (8), tan ω1 may be calculated. According to the formula (7), the distance h1 may be calculated. According to formulas (6) and (8), the angle θ1 may be calculated.

In addition, in consideration of focal power of the first Fresnel lens 110 at a temperature at which compensation is to be performed and focal power at the specific temperature, the following formula (9) may be obtained:

$$K = \frac{\Delta K}{n' - n}. \quad (9)$$

n' is a refractive index at the temperature at which compensation is to be performed. Therefore, according to the formula (2) and the fact that d1=r/2, the distance d1 may be calculated. According to the formula (3), the distance h0 may be calculated. According to the formulas (5)-(6), the distance h1 may be calculated. By analogy, according to the geometric relationship in FIG. 9 and the above formulas, such as the formulas (5)-(6), an angle θ2 and a distance h2 in FIG. 9 may be further calculated. The distance h2 is a size of an optical effective surface 112b′ next to the optical effective surface 112b closest to the central surface 112c and sizes of other optical effective surfaces 112b of the first Fresnel lens 110.

Based on the above, according to the self-temperature focus compensation device in the embodiments of the invention, since each Fresnel lens group has zero focal power at the specific temperature, and the sum of the focal power change of the at least one Fresnel lens group with the temperature change and the focal power change of the lens group with the temperature change is zero, the self-temperature focus compensation device can compensate the focal power change of the lens group with the temperature change. Compared to processing manners such as using a temperature control device, the self-temperature focus compensation device according to the embodiments of the invention has lower costs and is applicable to most lens groups. Moreover, since the Fresnel lens group may be a cemented lens, a system length of the self-temperature focus compensation device is relatively small. In addition, since the air gaps G of the first Fresnel lens and the second Fresnel lens in the Fresnel lens group along the optical axis A of the Fresnel lens group of the first Fresnel lens and the second Fresnel lens may be greater than zero, an air gap G of the Fresnel lens group may be used as a compensation space for a volume change caused by a temperature change. Therefore, system deformation of the Fresnel lens group caused by the temperature change can be reduced, facilitating maintaining of imaging quality of the self-temperature focus compensation device.

What is claimed is:
1. A self-temperature focus compensation device, adapted to cooperate with a lens group, comprising:

at least one Fresnel lens group, wherein each Fresnel lens group has zero focal power at a specific temperature, is a cemented lens, and comprises:
a first Fresnel lens having positive focal power; and
a second Fresnel lens having negative focal power, wherein
a sum of a focal power change of the at least one Fresnel lens group with a temperature change and a focal power change of the lens group with the temperature change is zero,
wherein focal power of the lens group is greater than zero, when a temperature of the self-temperature focus compensation device is greater than the specific temperature, a difference between focal power of the second Fresnel lens at the temperature and focal power of the second Fresnel lens at the specific temperature is greater than zero, and when the temperature of the self-temperature focus compensation device is less than the specific temperature, the difference between the focal power of the second Fresnel lens at the temperature and the focal power of the second Fresnel lens at the specific temperature is less than zero.

2. The self-temperature focus compensation device according to claim 1, wherein the first Fresnel lens is made of glass, the second Fresnel lens is made of plastic, and a ratio of a refractive index change of the second Fresnel lens with a temperature to a refractive index change of the first Fresnel lens with the temperature is greater than 10.

3. The self-temperature focus compensation device according to claim 1, wherein the first Fresnel lens comprises a plurality of annular tooth-shaped first Fresnel surfaces surrounding the optical axis, the second Fresnel lens comprises a plurality of annular tooth-shaped second Fresnel surfaces surrounding the optical axis, the first Fresnel surface and the second Fresnel surface face each other, and a sum of a radius of curvature of the first Fresnel surface and a radius of curvature of the second Fresnel surface on an axis parallel to the optical axis is zero.

4. The self-temperature focus compensation device according to claim 3, wherein the first Fresnel lens comprises a first optical surface opposite to the first Fresnel surface, the first optical surface is a plane, the second Fresnel lens comprises a second optical surface opposite to the second Fresnel surface, and the second optical surface is a plane.

5. The self-temperature focus compensation device according to claim 3, wherein the first Fresnel lens comprises a first optical surface opposite to the first Fresnel surface, the first optical surface is a concave surface or a convex surface, the second Fresnel lens comprises a second optical surface opposite to the second Fresnel surface, the second optical surface is a concave surface or a convex surface, and a sum of a radius of curvature of the first optical surface and a radius of curvature of the second optical surface on an axis parallel to the optical axis is zero.

6. The self-temperature focus compensation device according to claim 3, wherein each Fresnel lens group satisfies the following relationship:

$$h' < \frac{d'}{\sqrt{n^2-1}},$$

where
h' is a distance of each annular tooth of the first Fresnel lens in a direction perpendicular to the optical axis, d' is a maximum thickness of each annular tooth of the first Fresnel lens in a direction parallel to the optical axis, and n is a refractive index of the first Fresnel lens.

7. A self-temperature focus compensation device, adapted to cooperate with a lens group, comprising:
at least one Fresnel lens group, wherein each Fresnel lens group has zero focal power at a specific temperature and comprises:
a first Fresnel lens having positive focal power; and
a second Fresnel lens having negative focal power, wherein air gaps of the first Fresnel lens and the second Fresnel lens along an optical axis of the Fresnel lens group of the first Fresnel lens and the second Fresnel lens are greater than zero; wherein
a sum of a focal power change of the at least one Fresnel lens group with a temperature change and a focal power change of the lens group with the temperature change is zero,
wherein focal power of the lens group is greater than zero, when a temperature of the self-temperature focus compensation device is greater than the specific temperature, a difference between focal power of the second Fresnel lens at the temperature and focal power of the second Fresnel lens at the specific temperature is greater than zero, and when the temperature of the self-temperature focus compensation device is less than the specific temperature, the difference between the focal power of the second Fresnel lens at the temperature and the focal power of the second Fresnel lens at the specific temperature is less than zero.

8. The self-temperature focus compensation device according to claim 7, wherein the first Fresnel lens is made of glass, the second Fresnel lens is made of plastic, and a ratio of a refractive index change of the second Fresnel lens with a temperature to a refractive index change of the first Fresnel lens with the temperature is greater than 10.

9. The self-temperature focus compensation device according to claim 7, wherein the first Fresnel lens comprises a plurality of annular tooth-shaped first Fresnel surfaces surrounding the optical axis, the second Fresnel lens comprises a plurality of annular tooth-shaped second Fresnel surfaces surrounding the optical axis, the first Fresnel surface and the second Fresnel surface face each other, and a sum of a radius of curvature of the first Fresnel surface and a radius of curvature of the second Fresnel surface on an axis parallel to the optical axis is zero.

10. The self-temperature focus compensation device according to claim 9, wherein the first Fresnel lens comprises a first optical surface opposite to the first Fresnel surface, the first optical surface is a plane, the second Fresnel lens comprises a second optical surface opposite to the second Fresnel surface, and the second optical surface is a plane.

11. The self-temperature focus compensation device according to claim 9, wherein the first Fresnel lens comprises a first optical surface opposite to the first Fresnel surface, the first optical surface is a concave surface or a convex surface, the second Fresnel lens comprises a second optical surface opposite to the second Fresnel surface, the second optical surface is a concave surface or a convex surface, and a sum of a radius of curvature of the first optical surface and a radius of curvature of the second optical surface on an axis parallel to the optical axis is zero.

12. The self-temperature focus compensation device according to claim 9, wherein each Fresnel lens group satisfies the following relationship:

$$h' < \frac{d'}{\sqrt{n^2-1}},$$

where
h' is a distance of each annular tooth of the first Fresnel lens in a direction perpendicular to the optical axis, d' is a maximum thickness of each annular tooth of the first Fresnel lens in a direction parallel to the optical axis, and n is a refractive index of the first Fresnel lens.

13. A self-temperature focus compensation device, adapted to cooperate with a lens group, comprising:
at least one Fresnel lens group, wherein each Fresnel lens group has zero focal power at a specific temperature, is a cemented lens, and comprises:
a first Fresnel lens having positive focal power; and
a second Fresnel lens having negative focal power, wherein
a sum of a focal power change of the at least one Fresnel lens group with a temperature change and a focal power change of the lens group with the temperature change is zero,
wherein focal power of the lens group is less than zero, when a temperature of the self-temperature focus compensation device is greater than the specific temperature, a difference between focal power of the first Fresnel lens at the temperature and focal power of the first Fresnel lens at the specific temperature is less than zero, and when the temperature of the self-temperature focus compensation device is less than the specific temperature, the difference between the focal power of the first Fresnel lens at the temperature and the focal power of the first Fresnel lens at the specific temperature is greater than zero.

14. The self-temperature focus compensation device according to claim 13, wherein the first Fresnel lens is made of plastic, the second Fresnel lens is made of glass, and a ratio of a refractive index change of the first Fresnel lens with a temperature to a refractive index change of the second Fresnel lens with the temperature is greater than 10.

15. A self-temperature focus compensation device, adapted to cooperate with a lens group, comprising:
at least one Fresnel lens group, wherein each Fresnel lens group has zero focal power at a specific temperature and comprises:
a first Fresnel lens having positive focal power; and
a second Fresnel lens having negative focal power, wherein air gaps of the first Fresnel lens and the second Fresnel lens along an optical axis of the Fresnel lens group of the first Fresnel lens and the second Fresnel lens are greater than zero; wherein
a sum of a focal power change of the at least one Fresnel lens group with a temperature change and a focal power change of the lens group with the temperature change is zero, wherein focal power of the lens group is less than zero, when a temperature of the self-temperature focus compensation device is greater than the specific temperature, a difference between focal power of the first Fresnel lens at the temperature and focal power of the first Fresnel lens at the specific temperature is less than zero, and when the temperature of the self-temperature focus compensation device is less than the specific temperature, the difference between the focal power of the first Fresnel lens at the temperature and the focal power of the first Fresnel lens at the specific temperature is greater than zero.

16. The self-temperature focus compensation device according to claim 15, wherein the first Fresnel lens is made of plastic, the second Fresnel lens is made of glass, and a ratio of a refractive index change of the first Fresnel lens with a temperature to a refractive index change of the second Fresnel lens with the temperature is greater than 10.

* * * * *